July 9, 1968 A. ZULIAN 3,391,867
CONTROL SYSTEM AND PARTS THEREFOR OR THE LIKE
Filed Oct. 23, 1965 6 Sheets-Sheet 1

INVENTOR
ALDO ZULIAN

BY
*Cauda & Cauda*

HIS ATTORNEYS

INVENTOR
ALDO ZULIAN

July 9, 1968    A. ZULIAN    3,391,867
CONTROL SYSTEM AND PARTS THEREFOR OR THE LIKE
Filed Oct. 23, 1965    6 Sheets-Sheet 4

FIG.5

INVENTOR
ALDO ZULIAN

BY

HIS ATTORNEYS

INVENTOR
ALDO ZULIAN

BY
HIS ATTORNEYS

United States Patent Office 3,391,867
Patented July 9, 1968

3,391,867
CONTROL SYSTEM AND PARTS
THEREFOR OR THE LIKE
Aldo Zulian, Yukon, Pa., assignor to Robertshaw
Controls Company, Richmond, Va., a corporation of Delaware
Filed Oct. 23, 1965, Ser. No. 503,998
5 Claims. (Cl. 236—15)

ABSTRACT OF THE DISCLOSURE

This disclosure relates to a control system for the bake and broil burners of a single cavity oven wherein a control device has a selector means for directing fuel to a conduit means that leads to both main burners, the conduit means having a bake burner valve therein to prevent the flow of fuel to the bake burner except when a pilot burner means of the bake burner has a certain flame condition and the conduit means having a broil burner valve therein which will prevent the flow of fuel to the broil burner except when a certain flame condition exists at the pilot burner means of the broil burner. The selector means of the control device when set in a broil position, will operate an electrical switch to effect opening of the broil burner valve as long as the broil burner valve is sensing a certain flame at the pilot burner means for the broil burner.

This invention elates to an improved fuel control system for a double burner oven or the like as well as to improved parts for such a control system or the like.

It is well known that various manufacturers have attempted to provide a cooking oven having a single cooking cavity heated for baking purposes by a lower bake burner or for broiling purposes by an upper broil burner.

However, in the past, such fuel control systems have required extremely complicated control means wherein the housewife or the like was required to adjust and set various dials and switches to effectively utilize either the bake burner or the broil burner.

According to the teachings of this invention, however, an improved fuel control system is provided for a double burner oven wherein the control device for the system has a single manually operated selector means whereby the housewife or the like can set the selector means in either a bake range position to utilize the bake burner or in a broil position to utilize the broil burner without requiring further control settings by the housewife or the like.

Accordingly, it is an object of this invention to provide an improved fuel control system for a double burner oven or the like having one or more of the novel features set forth above or hereinafter shown or described.

Another object of this invention is to provide an improved part for such a control system or the like.

Other objects, uses and advantages of this invention are apparent from a reading of this description which proceeds with reference to the accompanying drawings forming a part thereof and wherein:

While the various features of this invention are hereinafter described and illustrated as being particularly adaptable to provide a control device for a fuel burning double burner domestic oven or the like, it is to be understood that the various features of this invention can be utilized singly or in any combination thereof to provide a control device for other structure as desired.

Therefore, this invention is not to be limited to only the embodiment illustrated in the drawings because the drawings are merely utilized to illustrate one of the wide variety of uses of this invention.

Figure 1:
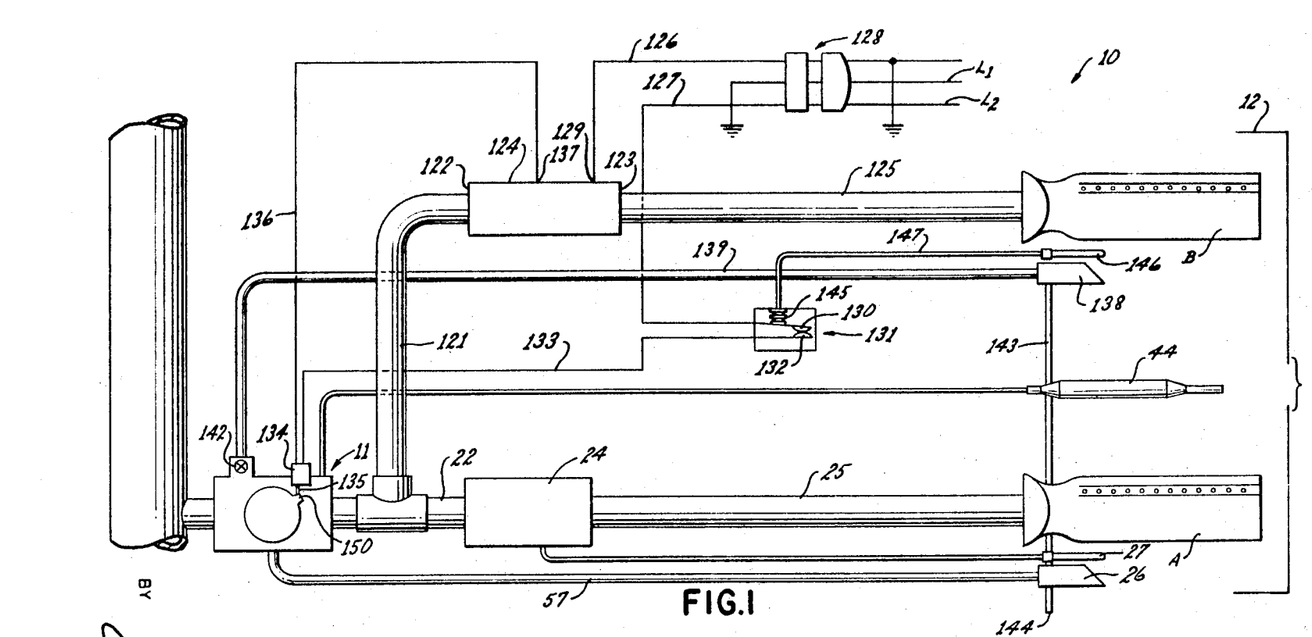
FIGURE 1 is a schematic view illustrating the improved fuel control system of this invention.

Referring now to FIGURE 1, the improved control system of this invention, generally indicated by the reference numeral 10, includes a control device 11 of this invention for controlling the operation of a bake burner means A and a broil burner means B disposed in a domestic oven 12 or the like, the control device 11 including a housing means 13.

Figure 2:
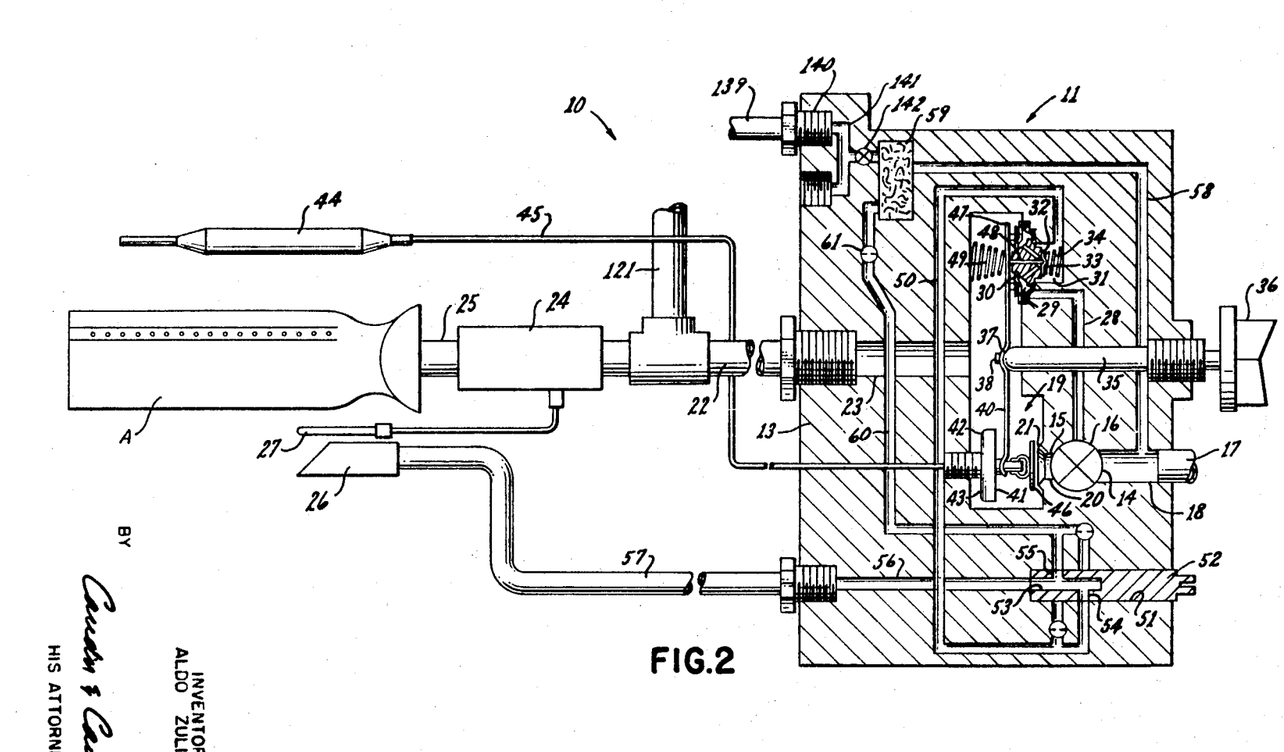
FIGURE 2 is also a schematic view of certain parts of the fuel control system of FIGURE 1 with the control device of this invention in schematic cross section.
Figure 3:
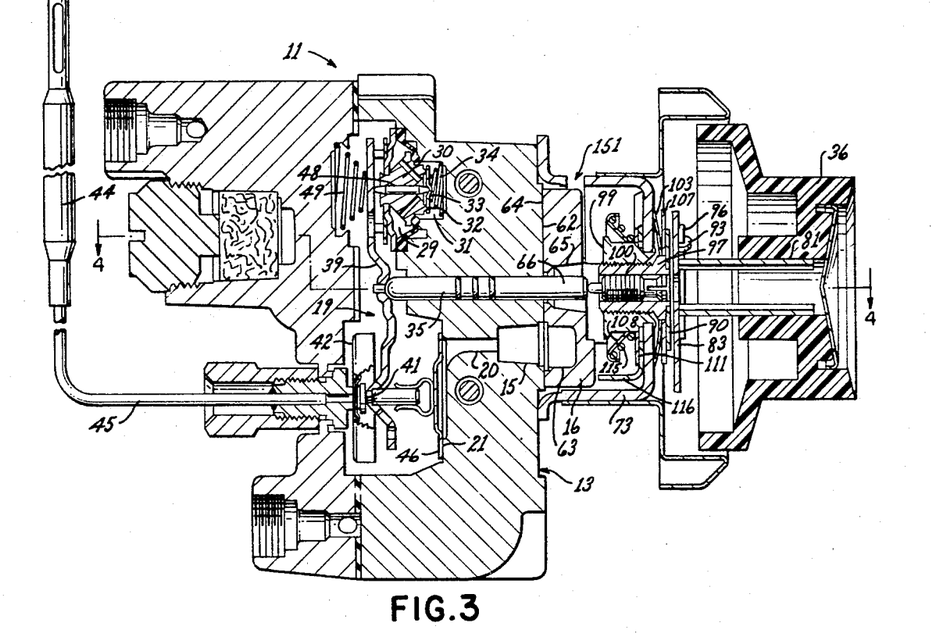
FIGURE 3 is a cross-sectional view of the control device of FIGURE 1 and is taken on line 3—3 of FIGURE 4.
Figure 4:
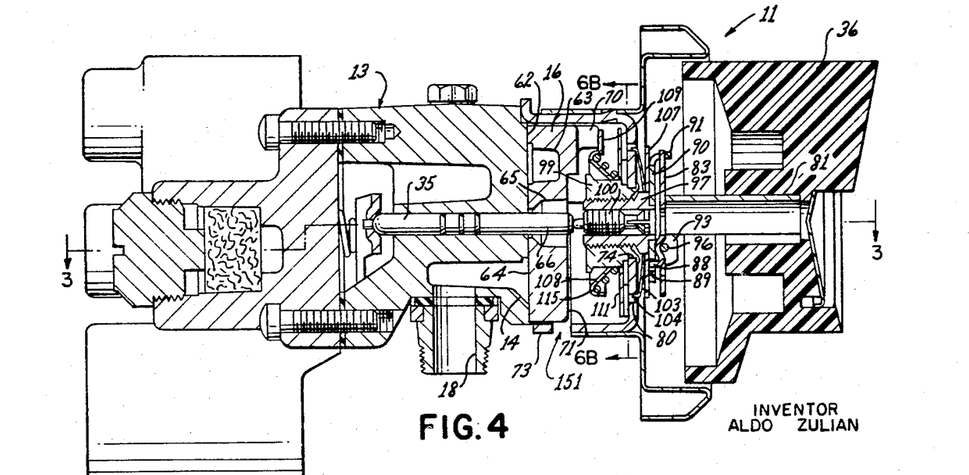
FIGURE 4 is a cross-sectional view of the control device of this invention and is taken substantially on the line 4—4 of FIGURE 3.

The housing means 13, as illustrated in FIGURES 2—4, has an inlet 14 and an outlet 15 adapted to be interconnected together by a disc valve member 16 in a manner hereinafter described, the inlet 14 being adapted to be interconnected to a fuel supply conduit 17 by a passage means 18 and the outlet 15 being adapted to be interconnected to a chamber 19 by means of a passage means 20 terminating with a valve seat 21. The chamber 19 is adapted to be interconnected to a conduit 22 by means of a passage 23, the conduit 22 leading to a safety valve 24. The outlet side of the safety valve 24 is interconnected to the bake burner A by a conduit 25.

A bake pilot burner 26 is disposed in the oven and is adapted to normally have a continuously burning small standby flame in a manner hereinafter described. However, when additional fuel is supplied to the pilot burner 26 in a manner hereinafter described, the same provides a relatively large heater flame which is sensed by a bulb 27 to open the safety valve 24 and interconnect the conduits 22 and 25 together whereby as long as a heater flame appears at the pilot burner 26, the chamber 19 of the control device 11 is interconnected to the bake burner A.

However, when the heater flame ceases to exist at the pilot burner 26, the safety valve 24 closes and prevents communication between the chamber 19 of the control device 11 and the bake burner means A for a purpose hereinafter described.

When the disc valve 16 is moved to a bake "on" position thereof in a manner hereinafter described, the same not only interconnects the inlet 14 with the outlet 15 but also interconnects the inlet 14 with the passage means 28 leading to a chamber 29 defined by a valve seat member 30 carried by the housing 13. The chamber 29 is separated from a chamber 31 by a valve seat 32 on the valve seat member 30, the valve seat 32 being opened and closed by a valve member 33 urged to the closed position by a compression spring 34.

An axially movable fulcrum pin 35 is carried by the housing 13 in such a manner that the axial position of the fulcrum pin 35 relative to the housing 13 is controlled by a control knob 36 in a manner hereinafter described. The fulcrum pin 35 has a rounded end 37 provided with a cylindrical projection 38 passing through a suitable aperture 38 in a lever 39 whereby the lever 39 is fulcrumed on the end 37 of the fulcrum pin 35.

One end 40 of the lever 39 bears against a movable wall 41 of an expansible and contractible element 42 having a wall 43 fixed to the housing 13, the interior of the expansible and contractible element 42 being interconnected to an oven temperature sensing bulb 44 by a conduit 45. The movable wall 41 of the expansible and contractible element 42 carries a valve member 46 for opening and closing the valve seat 21 in a manner hereinafter described.

The other end 47 of the lever 39 is adapted to engage a plunger 48 carried by the valve seat member 30 and engaging the valve member 33, the end 47 of the lever 39 being urged in a clockwise direction in FIGURE 2 by a compression spring 49. Thus, the opening and closing of the valve member 33 is controlled by the lever 39 in relation to the temperature sensed by the bulb 44 and the axial position of the fulcrum pin 35 in a manner hereinafter described.

The chamber 31 of the housing 13 is interconnected to a passage means 50 leading to a bore 51 in the housing 13, an adjusting key 52 being rotatably disposed in the bore 51 and having a longitudinal bore 53 interconnected to the exterior of the key 52 by transverse bores 54 and 55. The longitudinal bore 53 of the adjusting key 52 is disposed in communication with a passage 56 leading to a conduit 57 interconnected to the pilot burner 26.

Another passage 58 is formed in the housing 13 and is interconnected with the passage 18 at a point upstream from the disc valve 16 as well as to a filter chamber 59. The filter chamber 59 is interconnected to a passage 60 leading to the bore 51 in the manner illustrated in FIGURE 2, the passage 60 having an orifice 61 therein.

Thus, it can be seen that when the adjusting key 52 is disposed in the "on" position, as illustrated in FIGURE 2, fuel from the supply conduit 17 is adapted to pass through the passages 58 and 60 to the passage 55 of the adjusting key 52, and thus, to the pilot burner 26 to provide the previously mentioned small standby flame, which does not affect the safety valve 24.

However, when the disc valve 16 is moved to an opened bake position and the valve member 33 is moved to an opened position in a manner hereinafter described, the additional fuel being supplied through the passage 50 to the passage 54 of the adjusting key 52 causes the pilot burner 26 to provide a large heater flame which is sensed by the bulb 27 and causes the safety valve 24 to open and interconnect the conduits 22 and 25 together so that fuel can issue from the bake burner A and be ignited by the pilot burner 26. However, when the valve member 33 closes, the additional supply of fuel to the pilot burner 26 is terminated whereby the large heater flame ceases to exist, even though the small standby flame continues, whereby the safety valve 24 will close and prevent fuel from issuing from the bake burner A.

Thus, as the valve member 33 cycles between its open and closed positions in a manner hereinafter described, the bake burner A is cycled on and off to maintain the temperature of the oven at a baking temperature selected by the control knob 36 in a manner hereinafter described.

As illustrated in FIGURES 3, 4, 6A and 7A, the housing means 13 defines a flat surface 62, interrupted by the spaced inlet 14 and outlet 15 adapted to be interconnected together by a groove 63 in the disc valve 16. In addition, the surface 62 is interrupted by a port 14A interconnected to the inlet 14 by passage means 14B. The surface 62 is also interrupted by a port 28A in spaced relation to the port 14A and interconnected to the passage 28, the ports 14A and 28A being adapted to be interconnected together by a groove 63A in the disc valve 16.

In particular, the grooves 63 and 63A in the disc valve 16 interrupt a valve surface 64 thereof with the valve surface 64 being disposed in sealing and sliding contact with the valve seat surface 62 of the housing 13, the disc valve 16 having an opening 65 passing therethrough and loosely receiving the end 66 of the fulcrum pin 35.

Figure 5:
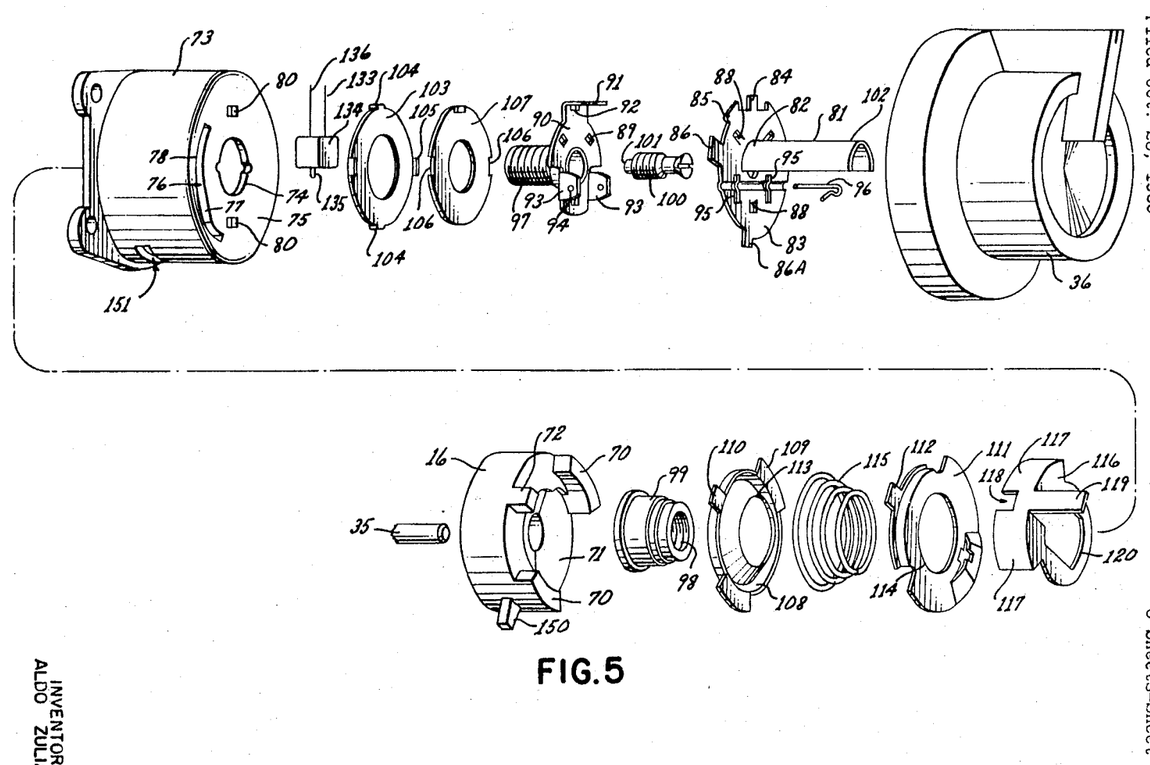
FIGURE 5 is an exploded perspective view of the various parts of the control device of this invention.

As illustrated in FIGURES 4 and 5, the disc valve 16 has a pair of spaced arcuate embossments 70 formed on the side 71 thereof and a smaller substantially rectangular embossment 72 intermediate the embossments 70 for a purpose hereinafter described.

A cup-shaped member 73 forms part of the housing means 13 and is telescopically disposed over the disc valve 16, the member 73 having an aperture 74 passing therethrough in the closed end 75 thereof. The closed end 75 has a cam slot 76 formed therein and defining opposed camming edges 77 and 78 best illustrated in FIGURES 3 and 4. In addition, a pair of apertures 80 pass through the wall 75.

A C-shaped shaft 81 has one end 82 thereof interconnected to a plate member 83 having four outwardly projecting tangs 84, 85, 86 and 86A. In addition, rearwardly directed tangs 88 are formed in the plate member 83 and are adapted to register with apertures 89 formed on another plate member 90.

This plate member 90 has a bent over tang 91 provided with a slot 92 and a pair of ears 93 having apertures 94 passing therethrough. The members 83 and 90 are adapted to be assembled together with the tang 84 of the member 83 received in the slot 92 of the member 90 and with the ears 93 of the member 90 passing through slots 95 of the plate member 83 and pinned thereto by a pin means 96 passing through the apertures 94. In this manner, rotation of the shaft 81 causes like rotation of the plate member 90.

The plate member 90 carries a tubular extension 97 both internally and externally threaded, the tubular extension 97 adapted to be threadedly received in a threaded bore 98 of a member 99 fixed in the aperture 74 of the housing part 73.

An adjusting screw 100 is threaded in the tubular part 97 of the plate 90 and has an end 101 adapted to abut the end 66 of the fulcrum pin 35.

Thus, rotation of the control knob 36 fastened on the other end 102 of the C-shaped shaft 91 causes the member 97 to be threaded into or out of the fixed threaded member 99 to adjust the axial position of the fulcrum pin 35.

A bowed spring-like washer 103 is provided and has tangs 104 adapted to register in the apertures 80 of the housing part 73, the spring means 103 having reversely directed tangs 105 adapted to be received in notches 106 in a washer-like member 107, the spring member 106 and washer-like member 107 being disposed between the closed wall 75 of the housing part 73 and the plate member 90 to place an outward force on the plate-like member 90, and, thus, provide "feel" in adjusting the rotational position of the knob 36 relative to the housing 13.

A spring retainer 108 is provided and has outwardly directed tangs 109 adapted to rest on the embossments 70 of the disc valve 16 and another tang 110. Another spring retainer 111 is provided and has an outwardly directed tang 112 similar to tang 110 of the spring retainer 108, retainers 108 and 111 respectively having openings 113 and 114 passing therethrough so that the same can be telescoped on the fixed threaded member 99. A compression spring 115 is adapted to be disposed between the spring retainers 108 and 111 to compact the spring retainers 108 and 111 to compact a clutch member 116 against the inside surface of the wall 75 of the housing part 73.

The clutch part 116 has a pair of depending flanges 117 defining a notch 118 therebetween adapted to not only receive the tangs 112 and 110 of the spring retainers 111 and 108, but to also receive the rectangular embossment 72 of the disc valve 16. In addition, the clutch member 116 has an outwardly directed tang 119 adapted to pass through the cam slot 76 of the housing part 73, the clutch part or drive member 116 having an aperture 120 passing therethrough to loosely receive the fixed member 99.

The operation of the control device 11 as utilized in the system 10 of this invention, with the parts heretofore described, will now be described in connection with only the bake burner A.

Figure 6:
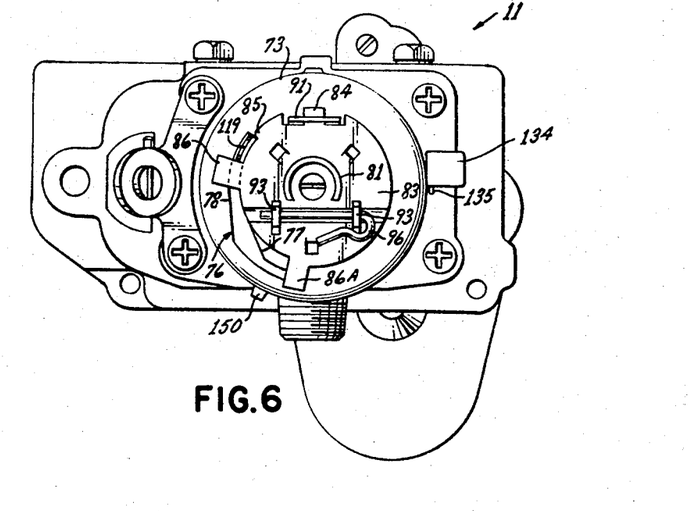
FIGURE 6 is a front view of the control device of this invention with the control knob thereof removed.
Figure 6A:
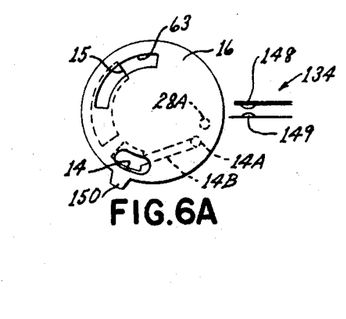
FIGURE 6A is a schematic view illustrating the disc valve position of the control device of this invention as set in the position of FIGURE 6.

Assuming that the control knob 36 is disposed in its "off" position as illustrated in FIGURES 2 and 6A, the grooves 63 and 63A of the disc valve 16 are in such positions that the same do not interconnect the inlet 14 with the outlet 15 or the inlet 14 with the passage means 28 whereby no fuel is directed to the bake burner means A and only a small standby flame exists at the pilot burner 26 as the adjusting key 42 is normally disposed in the "on" position as illustrated in FIGURE 2.

Figures 6B, 7B, 8, 9:
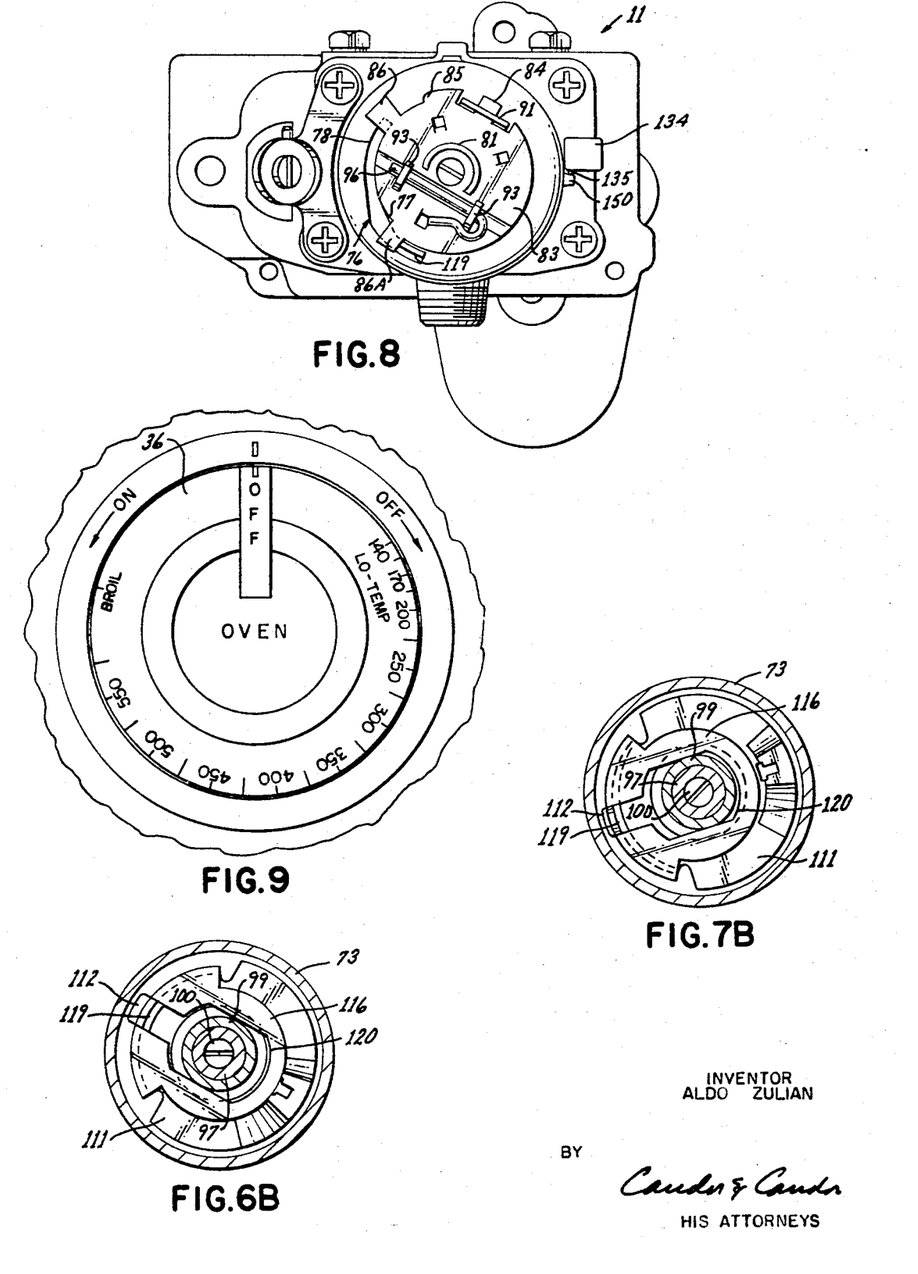
FIGURE 6B is a fragmentary cross-sectional view taken substantially on the line 6B—6B of FIGURE 4 and illustrates the clutch mechanism position the control device as set in the position of FIGURE 6.
FIGURE 7B is a view similar to FIGURE 6B and illustrates the clutch position of the control device as set in the position of FIGURE 7.
FIGURE 8 is a view similar to FIGURE 6 with the control device of this invention set in another operating position thereof.
FIGURE 9 is an enlarged fragmentary front view of the control device of this invention and illustrates the control knob thereof.

When the operator desires to turn on the oven to a set baking temperature thereof, the operator grasps the knob 36 and rotates the same in a counterclockwise direction as illustrated in FIGURE 9 whereby rotation of the knob 36 causes like rotation of the plate 83 whereby the tang 85 of plate 83 bears against the tang 119 of the drive member 116 to cause like rotation therewith. As the drive member 116 is being rotated, the same, through the notch 118 thereof, rotates the spring retainers 111 and 108 as well as the disc valve 16 to bring the grooves 63 and 63A of the disc valve 16 in such a position that the groove 63 fully interconnects the inlet 14 with the outlet 15 and the groove 63A fully interconnects the port 14A with the port 28A as illustrated in FIGURE 7A.

Figure 7:
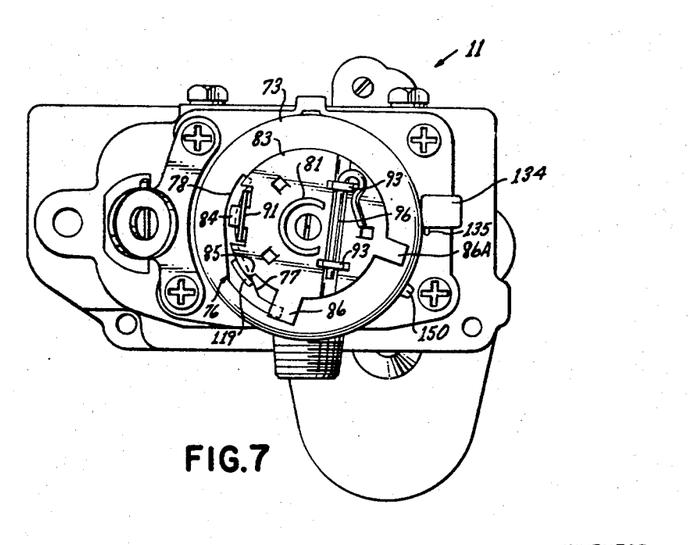
FIGURE 7 is a view similar to FIGURE 6 and illustrates the control device in another operating position.
Figure 7A:
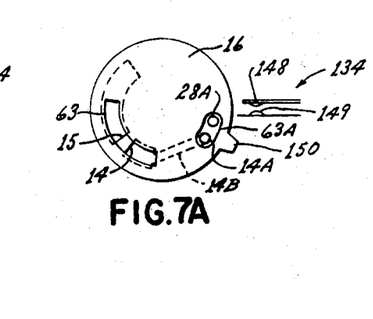
FIGURE 7A is a view similar to FIGURE 6A and illustrates the disc valve position as set in the position of FIGURE 7.

However, when the disc valve 16 is rotated to its fully "on" bake position as illustrated in FIGURE 7A, it can be seen that the edge 77 of the cam slot 76 slides the drive member 116 radially outwardly, as illustrated in FIGURE 7B, whereby the tang 85 of the plate member 83 is no longer in engagement with the tang 119 of the drive member 116 so that the control knob 36, when further rotates in a counterclockwise direction, does not further rotate the disc valve 16 from its fully "on" position as illustrated in FIGURES 6 and 7A. Thus, the sliding movement of the drive member 116 declutches the disc valve 16 from the control knob or manipulator means 36.

During the rotational movement of the control knob 36 from its position to a set baking temperature position thereof, the threaded member 97 of the plate 90 is backed out of the fixed threaded member 99 in such a manner that the fulcrum pin 35 is adjusted to a new position thereof to the right in FIGURES 3 and 4 as selected by the temperature setting of the control knob 36.

This axial movement of the pin 35 from its "off" position to its selected temperature position permits the compression spring 49 to pivot the same on the fulcrum pin 35 in such a manner that the pin 48 carried by the valve seat member 30 is moved to the right in FIGURE 3 to open the valve member 33 away from the valve seat 32 so that fuel in the passage 28 is now adapted to pass into the chamber 31 and, thus, to the pilot burner 26 to create the large heater flame at the pilot burner 26.

When the large heater flame exists at the pilot burner 26, the temperature sensing bulb 27 senses the presence of the same and opens the safety valve 24 whereby fuel in the chamber 19 is adapted to flow to the bake burner A and be ignited by the pilot burner 26.

Thus, as long as the temperature of the oven remains below the selected temperature, the bake burner A is operating.

However, when the temperature of the oven reaches the selected temperature, as sensed by the sensing bulb 44, the movable wall 41 of the expansible and contractible element 42 has moved to the right in FIGURE 3 to such an extent that the same pivots the lever 39 on the fulcrum pin 35 to a position which permits the valve member 33 to close against the valve seat 32 and terminate the additional flow of fuel to the pilot burner 26. Thus, the large heater flame at the pilot burner 26 ceases to exist whereby the safety valve 24 closes to terminate the flow of fuel to the bake burner means A.

Should the temperature of the oven again fall below the selected temperature, the movable wall 41 of the element 42 has moved to the left in FIGURE 3 a distance sufficient to cause the lever 39 to again open the valve member 33 so that the heater flame can again exist at the pilot burner 26. With the heater flame at the pilot burner 26, the safety valve 24 again opens so that fuel can again issue from the bake burner means A and be ignited by the pilot burner 26.

Thus, it can be seen that the control device 11 in this invention permits the control knob 36 to be turned from an "off" position thereof to any baking position thereof to not only rotate the disc valve 16 to an "on" baking position of the fulcrum pin 35 so that the control device 11 will maintain the oven at the selected baking temperature while only utilizing the bake burner A, the control device 11 of this invention being so constructed and arranged that the drive member 116 declutches the disc valve 16 from the control knob 36 during the rotational movement of the control knob 36 after the disc valve 16 has been disposed in its fully "on" baking position.

Should a malfunction occur in the control device 11 of this invention, so that the valve member 33 will not close whereby the bake burner means A remains on in a runaway condition, the increased temperature in the oven will cause the movable wall 41 of the power element 42 to further move to the right in FIGURE 3 to bring the valve member 46 closer to the valve seat 21 to throttle the flow of fuel to the bake burner means A in such a manner that the bake burner means A can not produce a temperature in the oven above a predetermined safe temperature.

When it is desired to turn off the system 10 of this invention after the same has been set in its baking position in the manner set forth above, the operator rotates the control knob 36 back to the "off" position illustrated in FIGURES 6 and 6A. As the plate 83 is being rotated to its "off" position, the tang 86 thereof engages the tang 119 of the drive member 116 and rotates the drive member 116 therewith whereby the disc valve 16 is rotated back to its "off" position, the drive member 116 sliding radially inwardly relative to the disc valve 16 by means of the edge 78 of the cam slot 76 in the housing part 73. As the control knob 36 is rotated back to its "off" position, the tang 119 on the drive member 116 engages the end of the slot 76 when the control knob is disposed in its "off" position whereby the cam slot 76 determines the "off" position of the control knob 36.

In regards to the broil burner B of the fuel control system 10 of this invention, it can be seen in FIGURE 1 that a conduit 121 is interconnected to the conduit 22 intermediate the control device 11 and the bake safety valve 24 and leads to an inlet end 122 of a solenoid operated broil burner safety valve 124. The outlet end 123 of the safety valve 124 is interconnected to a conduit 125 leading to the broil burner B.

The broil safety valve 124 is so constructed and arranged in a conventional manner that a valve member therein is normally disposed in a closed position to prevent fluid communication between the inlet end 122 and the outlet end 123 thereof when no electrical current is being supplied to the solenoid of the safety valve 124. However, when the solenoid of the safety valve 124 is energized by an electrical current, the valve member of the safety valve 124 moves to an open position to fluidly interconnect the inlet end 122 with the outlet end 123 whereby if the control device 11 is supplying fuel to the conduit 22 in a manner hereinafter described, the fuel in the conduit 22 is directed by the conduit 121, open safety valve 124 and conduit 125 to the broil burner B.

A source of electrical current is provided by power leads $L_1$ and $L_2$, adapted to be interconnected to leads 126 and 127 by coupling means 128 in a conventional manner. However, the lead 126 is interconnected to one side 129 of the broil burner safety valve 124, while the lead 127 is interconnected to a movable contact 130 of a flame sensing switch 131.

The other contact 132 of the flame sensing switch 131 is interconnected by a lead 133 to an electrical switch 134 carried by the control device 11. The electrical switch 134 is a normally open switch and when the same is closed in a manner hereinafter described by activation of a plunger 135 thereof, the electrical switch 134 interconnects the lead 133 with a lead 136 leading to the other side 137 of the broil burner safety valve 124.

A continuously burning broil pilot burner 138 is provided to ignite fuel issuing from the broil burner B in a manner hereinafter described, the pilot burner 138 being adapted to continuously receive fuel from a conduit 139 interconnected to a pilot outlet port 140, FIGURE 2, of the control device 11, which, in turn, is interconnected to the previously described filter chamber 59 by passage means 141 opened and closed by a suitable adjusting key 142.

Thus, since the filter chamber 59 is continuously supplied fuel by the previously described passage means 58, fuel is continuously supplied to the broil pilot burner means 138 to produce a continuous flame at the pilot burner 138, having a flame size set by the key 142, the pilot burner 138 receiving clean primary air from a snorkel tube 143 having its inlet 144 disposed below the bake burner A so that the combustion products in the oven 12 produced by the operation of the bake burner A will not extinguish the flame of the broil pilot burner 138.

The flame sensing switch 131 has an expansible and contractible power element 145 interconnected to a flame sensing bulb 146 by a conduit means 147 whereby as long as a flame exists at the broil pilot burner 138 the power element 145 holds the contact 130 into electrical contact with the contact 132. However, should the flame at the pilot burner 138 inadvertently be extinguished, the power element 135 contracts and separates the contact 130 from the contact 132 to prevent opening of the safety valve 124 so that fuel cannot be directed to the broil burner B if there is no flame at the broil pilot burner 138 to ignite the fuel issuing from the broil burner B.

Figure 8A:
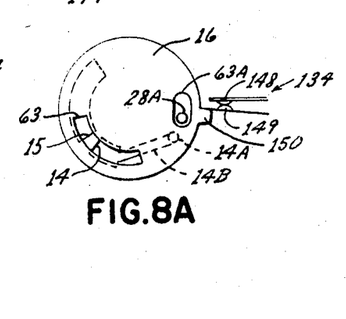
FIGURE 8A is a view similar to FIGURE 6A and illustrates the disc valve as set in the position of the control device of FIGURE 8.

As illustrated in FIGURES 6A, 7A and 8A, the electrical switch 134 carried by the control device 11 has the lead 136 interconnected to a fixed contact 148 while the lead 133 is interconnected to a movable contact 149, the movable contact 149 normally being disposed out of electrical contact with the contact 138.

However, the disc valve 16 has an outwardly directed tang 150 adapted to project out through a slot 151 in the casing member 73 so that when the disc valve 16 is moved to its broil position as illustrated in FIGURES 8 and 8A, the tang 150 of the disc valve 16 places the contact 139 into electrical contact with the contact 148 so that electrical current can be supplied to the solenoid of the safety valve 124, if the flame switch 131 is sensing a flame at the broil pilot burner 138, whereby the safety valve 124 will open and fluidly interconnect the conduits 121 and 125.

The operation of the fuel control system 10 of this invention will now be described in connection with the broil burner B.

When the housewife or the like desires to utilize the broil burner B of the oven 12 and the control knob 36 is disposed in its off position, the housewife rotates the control knob 36 in a counterclockwise direction in FIGURE 9 to move the disc valve 16 from the position illustrated in FIGURE 6A to the position illustrated in FIGURE 7A whereby the disc valve 16 is declutched from the control knob 36 by the sliding movement of the clutch member 116 in the manner previously described.

However, as the control knob 36 is continued to be rotated in a counterclockwise direction, the tang 86A on the plate member 83 comes into engagement with the drive tang 119 of the clutch member 116 as the control knob 36 reaches the end of its bake range position. Further rotation of the control knob 36 from the end of its bake range position to its broil position, causes the tang 86A on the drive plate 83 to rotate the clutch member 116 from the position illustrated in FIGURE 7 to the position illustrated in FIGURE 8 until the drive tang 119 is disposed against the end of the cam slot 76.

As the clutch member 116 is being rotated from the position illustrated in FIGURE 7 to the position illustrated in FIGURE 8, the clutch member 116 rotates the disc valve 16 from the position illustrated in FIGURE 7A to the position illustrated in FIGURE 8A whereby the groove 63A of the position illustrated in FIGURE 7A to the position illustrated in FIGURE 8A whereby the groove 63A of the disc valve 16 moves away from the part 14A to prevent fluid communication between the ports 14A and 28A so that the bake pilot burner means 26 ceases to have the large heater flame thereof and only the small standby flame thereof whereby the bake safety valve 24 closes so that no fuel can issue from the bake burner A. However, it can be seen that with the disc valve 16 now in the position illustrated in FIGURE 8A, the groove 63 still interconnects the inlet 14 with the outlet 15 whereby fuel is directed from the inlet 14 to the conduit 22 and, by means of the conduit 121 to the broil burner safety valve 124.

When the disc valve 16 is disposed in the broil position as illustrated in FIGURE 8A, the tang 150 of the disc valve 16 closes the switch 134 whereby the solenoid of the broil burner safety valve 124 is energized, if the flame sensing switch 131 is sensing a flame at the broil pilot burner 138, whereby the safety valve 124 opens to direct fuel to the broil burner B which is ignited by the pilot burner 138.

As long as the disc valve 16 is disposed in the position illustrated in FIGURE 8A, the broil burner B has a continuous flame for broiling purposes.

However, should the temperautre of the oven 12 exceed a predetermined safe limit during the operation of the broil burner B, the temperature sensing bulb 44 has caused the movable wall of the power element 42 to move to the right in FIGURE 3 a distance sufficient to cause the valve member 46 to approach the valve seat 21 and throttle down the flow of fuel being directed to the broil burner B so that the temperature of the oven 12 will not exceed a safe high limit temperature while still providing continuous flame broiling in the oven 12.

When it is desired to turn off the broil burner B, the housewife or the like rotates the control knob 36 in a clockwise direction in FIGURE 9 from the broil position thereof to the off position thereof whereby as the drive plate 83 is rotated in unison therewith the tang 86 thereof engages the drive tang 119 of the clutch member 116 and rotates the clutch member 116 therewith whereby the disc valve 16 is rotated back to its off position as illustrated in FIGURES 6 and 6A, the drive member 116 sliding radially inwardly relative to the disc valve 16 by means of the edge 78 of the cam slot 76 in the housing part 73.

As the disc valve 16 is moved from the position of FIGURE 8A back to the off position of FIGURE 6A, it can be seen that the tang 150 of the disc valve 16 opens the switch 134 to terminate the supply of electrical current to the solenoid of the safety valve 124 whereby the safety valve 124 closes so that no more fuel can issue to the broil burner B until the switch 134 is again closed by the selector means 36 being disposed in its broil position.

Therefore, it can be seen that the fuel control system of this invention permits a single control device 11 to have a single selector means 36 for operating either the bake burner A or broil burner B of a double burner oven 12 in a simple manner while preventing dangerous conditions in the oven 12 even though the operation of the burner means A and B is completely automatic.

Thus, this invention not only provides an improved fuel control system for a double burner oven or the like, but also this invention provides improved parts for such a control system or the like.

While the form of the invention now preferred has been disclosed as required by statute, other forms may be used, all coming within the scope of the claimed subject matter which follows.

What is claimed is:

1. In a fuel control system for an oven having a bake burner and a broil burner, a control device having selector means for causing a supply of fuel to pass through an inlet of said control device to an outlet of said control device, conduit means leading from said outlet to said burners, a bake burner valve in said conduit means, said bake burner valve when in the closed position preventing the flow of fuel to said bake burner and when in the open position permitting the flow of fuel to said bake burner, a broil burner valve in said conduit means, said broil burner valve when in a closed position preventing the flow of fuel to said burner and when in an opened position permitting the flow of fuel to said broil burner, a bake pilot burner for opening said bake burner valve only when a certain flame appears at said bake pilot burner, and a broil pilot burner for permitting opening of said broil burner valve when a certain flame appears at said broil pilot burner, said selector means interconnecting said fuel supply to said conduit means and causing said certain flame at said bake pilot burner only when said selector means is in a bake range position, said selector means interconnecting said source of fuel to said conduit means and opening said broil burner valve only when said selector means is in a broil position, said broil burner valve being electrically operated and said broil pilot burner permitting the flow of electrical current to said broil burner valve only when said certain flame appears at said broil pilot burner, said control device having an electrical switch which when closed tends to send electrical current to said broil burner valve to open the same, said switch being closed only when said selector means is moved to said broil position thereof, said control device having means to supply fuel to said broil pilot burner to produce said certain flame regardless of the position of said selector means.

2. A control device for an oven or the like having a bake burner and a broil burner, said control device having selector means and having an inlet to be interconnected to a fuel supply and an outlet to be interconnected to said burners, said control device having a valve means moved by said selector means for interconnecting said inlet with said outlet when said selector means is in an "on" position, said control device having outlet means for directing fuel from said inlet to pilot burner means for said burners, said valve means only interconnecting said inlet with the outlet means for said pilot burner means of the bake burner when said selector means is in a bake range position, said control device having clutching means for causing said valve means to move with said selector means as said selector means moves from an "off" position to a certain "on" position in the bake range thereof and to prevent movement of said valve means as said selector means moves from said certain "on" position to the end of said bake range position.

3. A control device as set forth in claim 2 wherein said clutching means has means for engaging said valve means to move said valve means with said selector means as said selector means moves from the end of said bake range position to a broil position thereof.

4. A control device for an oven or the like having a bake burner and a broil burner, said control device having selector means and having an inlet to be interconnected to a fuel supply and an outlet to be interconnected to said burners, said control device having a valve means moved by said selector means for interconnecting said inlet with said outlet when said selector means is an "on" position, said control device having outlet means for directing fuel from said inlet to pilot burner means for said burners, said valve means only interconnecting said inlet with the outlet means for said pilot burner means of the bake burner when said selector means is in a bake range position, said control device having means for always interconnecting said inlet with said outlet means for said pilot burner means of said broil burner regardless of the position of said selector means, said control device carrying an electrical switch for operating the broil burner when said switch is moved from one position thereof, said selector means causing said switch to be moved to said one position thereof when said selector means is in the broil position thereof.

5. A control device as set forth in claim 4 wherein said valve means has means for engaging said switch to move said switch to said one position thereof.

References Cited
UNITED STATES PATENTS

| | | | |
|---|---|---|---|
| 3,033,463 | 5/1962 | Doner et al. | 236—15 X |
| 3,092,323 | 5/1963 | Wantz | 236—68 |
| 3,194,227 | 7/1965 | Beach et al. | 236—15 X |
| 3,232,534 | 2/1966 | Branson | 236—15 |
| 3,236,448 | 2/1966 | Willson | 236—15 |
| 3,259,121 | 7/1966 | McGee | 236—15 X |
| 3,312,396 | 4/1967 | Willson | 236—15 |
| 3,312,397 | 4/1967 | Willson | 236—15 |

EDWARD J. MICHAEL, *Primary Examiner.*